United States Patent
Bremer et al.

(10) Patent No.: US 7,289,610 B2
(45) Date of Patent: Oct. 30, 2007

(54) DIGITAL SUBSCRIBER LINE SERVICE OVER LOADED LOOPS

(75) Inventors: Gordon Bremer, Clearwater, FL (US); William L. Betts, St. Petersburg, FL (US); Edward A. Thoenes, St. Petersburg, FL (US); Joseph Q. Chapman, Seminole, FL (US)

(73) Assignee: Summit Technology Systems, LP, Bala Cynwyd, PA (US)

( * ) Notice: Subject to any disclaimer, the term of this patent is extended or adjusted under 35 U.S.C. 154(b) by 352 days.

(21) Appl. No.: 10/435,219

(22) Filed: May 8, 2003

(65) Prior Publication Data

US 2003/0210773 A1    Nov. 13, 2003

Related U.S. Application Data (60) Provisional application No. 60/379,124, filed on May 8, 2002, provisional application No. 60/379,026, filed on May 8, 2002, provisional application No. 60/379,040, filed on May 8, 2002, provisional application No. 60/379,030, filed on May 8, 2002, provisional application No. 60/379,029, filed on May 8, 2002, provisional application No. 60/379,038, filed on May 8, 2002, provisional application No. 60/379,041, filed on May 8, 2002, provisional application No. 60/379,028, filed on May 8, 2002, provisional application No. 60/379,142, filed on May 8, 2002.

(51) Int. Cl.
*H04M 11/00* (2006.01)

(52) U.S. Cl. .................. 379/93.08; 379/93.31

(58) Field of Classification Search ............ 379/93.08, 379/93.01, 93.05, 93.28, 93.31, 399.01, 400–401; 375/222

See application file for complete search history.

(56) References Cited

U.S. PATENT DOCUMENTS 6,026,120 A    2/2000    Betts ........................ 375/261
6,307,893 B1   10/2001   Bremer et al. ............ 375/296

(Continued)

OTHER PUBLICATIONS

ITU-T G.992.2; Splitterless Asymmetric Digital Subscriber Line (ADSL) transceivers; International Telecommunication Union; Jun. 1999; pp. 1-174.

(Continued)

*Primary Examiner*—Stella Woo
(74) *Attorney, Agent, or Firm*—Woodcock Washburn LLP (57) ABSTRACT

The preferred embodiments of the present invention generally provide improved communications over a subscriber loop that is loaded with at least one and potentially a plurality of load coils. The preferred embodiments of the present invention will work over loaded subscriber loops that also support a native POTS interface as well as over loaded subscriber loops that are not providing a native POTS interface. Furthermore, although the preferred embodiments of the present invention are intended to address the technical and business problems of service providers delivering digital subscriber line service over loaded loops, the preferred embodiments will also work over unloaded loops. Various duplexing strategies such as, but not limited to, time-division duplexing (TDD), adaptive time-division duplexing (ATDD), four-wire duplexing, and/or extended performance echo cancelled duplexing (EP ECD) provide improved performance on loaded loops that generally offer significant signal attenuation at frequencies above 4 KHz. In addition, such duplexing strategies can start and stop quickly enough to pass various POTS interface signaling generally without creating a significant adverse effect on DSL data communications.

12 Claims, 3 Drawing Sheets

U.S. PATENT DOCUMENTS

| | | | |
|---|---|---|---|
| 6,324,212 B1 * | 11/2001 | Jenness | 375/222 |
| 6,408,056 B1 | 6/2002 | Bremer et al. | 379/93 |
| 6,414,964 B1 | 7/2002 | Holmquist et al. | 370/449 |
| 6,519,328 B1 * | 2/2003 | Rumbaugh | 379/93.06 |
| 6,580,785 B2 | 6/2003 | Bremer et al. | 379/88 |
| 6,658,096 B2 | 12/2003 | Bremer et al. | 379/93 |
| 6,665,349 B1 * | 12/2003 | Cherubini et al. | 375/261 |
| 6,715,124 B1 | 3/2004 | Betts | 714/792 |
| 6,829,292 B1 * | 12/2004 | Shenoi | 375/221 |
| 2002/0113649 A1 * | 8/2002 | Tambe et al. | 330/250 |
| 2002/0141569 A1 * | 10/2002 | Norrell et al. | 379/377 |
| 2003/0039348 A1 | 2/2003 | Bremer et al. | 379/220 |
| 2003/0063660 A1 * | 4/2003 | Shenoi et al. | 375/222 |
| 2003/0108190 A1 * | 6/2003 | Kaiser et al. | 379/399.01 |

OTHER PUBLICATIONS

ITU-T V.34; A modem operating at data signalling rates of up to 33,600 bit/s for use on the general switched telephone network and on leased point-to-point 2-wire telephone-type circuits; International Telecommunication Union: Feb. 1998; pp. i-iv, 1-72.

T1E1.4/2002-85; Performance of LE-ADSL on modified loaded loops longer than 18 kft; 2Wire, Inc.; Feb. 18-22, 2002; pp. 1-6.

T1E1.4/2002-86; LE-ADSL on modified loaded loops longer than 18 kft; 2Wire, Inc.; Feb. 18-22, 2002; pp. 1-3.

IEEE Communications Magazine, Dec. 1996; The V.34 High-Speed Modem Standard; G. David Forney, Jr., Less Brown, M. Vedat Eyuboglu, and John L. Moran, Copyright 1996; pp. 28-33.

ISBN 0070055920; The V Series Recommendations: Standards for Data Communications over the Telephone Network, Second Edition; Uyless Black; Copyright 1995; Chapter 5: The Voice-Band Modems Recommendaitons: pp. 81-109.

* cited by examiner

DIGITAL SUBSCRIBER LINE SERVICE OVER LOADED LOOPS

CROSS REFERENCE TO RELATED PATENT APPLICATIONS

This present application claims priority to several copending U.S. provisional applications that were all filed on May 8, 2002 and also are each incorporated by reference in their entirety herein. The copending U.S. provisional applications, which are incorporated by reference in their entirety herein, and to which priority is claimed, are listed by the following U.S. Ser. No. and titles:

| | |
|---|---|
| 60/379,124 | "Loaded Loop DSL Service and Business Method" |
| 60/379,026 | "Loaded Loop DSL Modulation" |
| 60/379,040 | "Automatic Selection of Loaded Loop DSL or Standard DSL Service" |
| 60/379,030 | "Loaded Loop DSL Loop Intercession System" |
| 60/379,029 | "Automatic Switching Between Loaded Loop DSL and POTS" |
| 60/379,038 | "Multiple POTS Services on a Loaded Loop" |
| 60/379,041 | "Utilization of More Than One Loaded Loop for DSL Service" |
| 60/379,028 | "Data Communication Over Loaded Loops Simultaneous with POTS Call" |
| 60/379,142 | "Indirect Loaded Loop DSL" |

Furthermore, the present application is one of three related patent applications that are being filed on the same day. The three patent applications listed by attorney docket number and title are the following:

| | |
|---|---|
| 10/435,219 | "Digital Subscriber Line Service Over Loaded Loops" |
| 10/434,847 | "Automatic Rapid Switching Between DSL Service and POTS Over Loaded Loops" |
| 10/434,864 | "Indirect DSL Over Loaded and Unloaded Loops" |

Also, the patent application with Ser. No. 10/434,847. entitled "Automatic Rapid Switching Between DSL Service and POTS Over Loaded Loops", and filed on May 8, 2003, is incorporated by reference in its entirety herein. In addition, the patent application with Ser. No. 10/434,864, entitled "Indirect DSL Over Loaded and Unloaded Loops", and filed on May 8, 2003, is incorporated by reference in its entirety herein.

TECHNICAL FIELD

The present invention generally is related to telecommunications and, more particularly, is related to a system and method for improving the delivery of digital subscriber line (DSL) service.

BACKGROUND OF THE INVENTION

Digital Subscriber Line or Loop (DSL) communication technologies have been adopted by telephone service providers as a way of extending digital service to customer premises (CP) such as homes and offices. The advent of digital communication technology has resulted in an evolutionary change to communication systems as the facilities of switches and trunks in the networks of telecommunications service providers were converted first from analog to digital. Next, consumers wanted digital access to these digital capabilities in the network facilities of service providers.

However, delivering digital services over the local loop or subscriber line facilities to cover what is often colloquially called "the last mile" to the customer premises has been more of a challenge to provision. While various mechanisms have been used to deliver digital services to customer premises, making major changes to the wiring plant that feeds subscribers generally is still prohibitively costly. For customers located near a central office (CO) or close to a digital loop carrier (DLC) system, with the generally corresponding short cable wiring runs, DSL service is often available.

However, DSL capabilities still are not available to many customers located at farther reaches from central office switches and/or digital multiplexers such as a DLC. Furthermore, the historical telephone wiring plant feeding many customer locations was designed and optimized for the analog voice frequency communications of plain old telephone service (POTS) primarily found in the 0 to 4 KHz range. (One skilled in the art will be aware that the common bandwidth for unloaded POTS loops is primarily found in the 0 to around 4 KHz range, while the common bandwidth for loaded POTS loops is primarily found in the 0 to around 3.4 KHz range. One skilled in the art will be aware of these actual bandwidth differences of loaded and unloaded loops in carrying native POTS communication even though the POTS baseband is commonly referred to as a 0-4 KHz POTS baseband. One of ordinary skill in the art will be aware that such a reference is not completely accurate for loaded loops, but is a useful shorthand when discussing the POTS baseband configurations.)

Historically, telephone companies often found it advantageous to install inductors or load coils on many local loops to optimize performance of the loops in carrying POTS voice communication. Generally, the load coils or inductors were installed in series at various points along the telephone local loop. On a properly designed local loop, load coils generally are placed on subscriber loops that are greater than or equal to 18 Kft. in length. The load coils commonly used by the Regional Bell Operating Companies (RBOCs) have 88 milli-Henrys as the standard nominal inductance value for the coils. In general, load coils are spaced along a subscriber loop beginning at approximately 3 Kft. from a line card in a CO switch or DLC chassis with additional coils generally spaced along the loop approximately each 6 Kft. thereafter. The customer end portion of a local loop generally is allowed to have lengths ranging from 3 Kft. to 12 Kft. beyond the last load coil. In general, the local loop design rules used by the RBOCs specify that three or more load coils should be used on loops that are 18 Kft. or longer in length. In some special assembly situations, such as but not limited to analog POTS loops used as trunks for a customer's PBX, the RBOCs may use load coils on loops as short as 15 Kft. in length with a minimum of two load coils.

Essentially, adding an inductor in series results in the creation of a low-pass filter. While the low-pass filtering of these load coils improves performance in the 0 to around 3 KHz base bandwidth of an analog POTS interface, the filtering results in detrimental effects (primarily attenuation) on the higher frequency signals above 3 KHz that generally are used in DSL technologies. Unfortunately, the problem is not solved simply by getting the service provider to remove the load coils on each loop. While such an action certainly solves the technical limitations of load coils on DSL performance, economically it is an expensive process to remove the load coils. Furthermore, removal of the loading coils re-introduces the voice-band degradations that the coils were introduced to overcome. As a result, the service provider often cannot justify the costs of basically custom re-engineering each of the multitude of subscriber lines to remove load coils in order to earn the additional revenues from offering DSL service. Removing load coils generally would involve identifying the location of all of the load coils on a subscriber loop and sending a technician to each location to take the load coil out of the subscriber line circuit. Just sending the technician to each location would be costly enough. However, the physical process of removing load coils can create additional problems. For instance, most cables in the underground are pulp insulated such that wire pairs can be easily damaged as a result of a technician or cable splicer working on the splice to locate the wire pair affected by load coils. Obviously, damage to other pairs may knock out phone service to existing customers.

In addition, often the databases and records of service providers are incomplete and/or inaccurate in keeping up with the location of all the load coils that were installed on a particular subscriber loop over the years. Thus, in some cases various transmission line tests (such as, but not limited to tests performed by a time-domain reflectometer or TDR) might have to be performed to determine the distance along a subscriber loop transmission line at which there are changes in the characteristic impedance of the transmission line indicating potential items such as, but not limited to, load coils, junction splices, bridge taps, and/or connection points. Because an impedance mismatch in a transmission line causes at least part of the energy from propagating electromagnetic signals to be reflected or echoed back in the opposite direction of the original propagation, a TDR and other types of test equipment generally can be used to send signals down a transmission line and measure the amount of time before a signal reflection or echo is received at the test equipment. This time measurement together with the estimated speed of propagation of the electromagnetic wave in the transmission line medium can be used to provide an estimate of the distance along the transmission line (such as a subscriber loop) where impedance mismatches occur. In general, telephone companies (or telcos) maintain computerized or paper plat records showing the location of telco facilities such as, but not limited to, wires, splice points, cross-connects, and DLCs used in delivering service to residential and commercial areas. The transmission line distances provided by a TDR or other test equipment for the potential location of impedance mismatches, which might be caused by load coils, would have to be used to estimate the approximate geographic location of a load coil based on the potentially inaccurate service provider records showing the wiring path for the transmission line from the central office or DLC to the customer premises. Obviously, such activities of identifying load coils and possibly having a technician physically track down the path followed by a subscriber loop transmission line can be costly. As a result of these load coil issues, either some customers are not offered DSL service at all or the price of the service is higher than it should be because of the increased costs of removing load coils. Thus, service providers are not able to offer DSL service to a relatively larger number of potential subscribers because of the load coil issue. Improving this load coil problem would increase the number of customers and associated revenues available to the service provider.

In addition, subscriber loops normally run through various other facilities in connecting a customer premises to a line card in a central office switch or in a digital multiplexer such as a DLC. Often telephone wiring is run in groups of large multi-pair cables from a connection co-located with the line cards to a splice point, junction terminal, or cross-connect point. The cross-connect point generally is an unpowered box where technicians can cross-connect the wires leading to a customer premises with the appropriate wires leading back to the line cards in a switch or DLC. Often the portion of a local loop transmission line from a cross-connect box back to a line card is known as the F1 or feeder portion of a local loop, while the portion of a local loop transmission line from the cross-connect to the customer premises is known as the F2 or distribution portion of a local loop. Normally, the cross-connect box uses various mechanical technologies (such as but not limited to various punch-down block technologies) that are common in telephone wiring to simplify a technician's work in connecting the two portions of a subscriber loop. Unlike a digital loop carrier (DLC) cabinet, which generally is provided with power from the central office (and/or other sources) to enable the operation of the electronic devices of the line cards and multiplexing equipment, cross-connect boxes and/or cabinets generally are not provided with power other than the powering delivered over the POTS interface of each in-service POTS loop that provides for basic POTS functionality powering to a customer premises. This power on a POTS loop is designed for powering POTS analog phones with basic functionality (such as, but not limited to, dial tone) at the customer premises and generally does not provide a significant amount of excess power that could be siphoned off to power other types of electronic digital communications equipment. Often analog phones with POTS interfaces that offer more functionality such as a speaker phone or memory need additional power from an AC outlet or battery at the customer premises because the POTS interface does not provide enough power to meet the needs of these additional electronic functions.

In providing DSL service, often the network-side or CO-side of the DSL line is terminated in a DSLAM (Digital Subscriber Line Access Multiplexer) that usually is capable of supporting multiple DSL loops. One skilled in the art will be aware that a DSLAM normally comprises a plurality of DSL modems and some statistical multiplexing concentration equipment. However, such DSLAM equipment normally needs a reasonable amount of power and is usually placed in locations where power is readily available such as a central office (CO) or DLC cabinet. As cross-connect boxes generally do not have power available for powering active electronics, DSLAMs are not placed in cross-connect boxes. Furthermore, cross-connect boxes generally are not large enough to encompass significant amounts of additional electronic equipment in contrast to the relatively larger cabinets containing DLCs. Thus, normal deployment of DSLAMs for providing DSL service to customers does not place DSLAMs in cross-connect boxes at least because cross-connect boxes generally do not have a ready source of sufficient power and cross-connect boxes generally are not large enough for holding the DSLAM equipment.

Given these and other limitations of the wiring cable plant that was often originally installed many years ago to just provide basic POTS, new innovations that increase the availability and lower the total costs of delivering digital subscriber line (DSL) service provide benefits that can allow more consumers to obtain a reasonable digital service access line at an affordable price point.

SUMMARY OF THE INVENTION

The preferred embodiments of the present invention provide an apparatus and/or method for increasing the availability of DSL service by allowing service to be offered to more subscribers without having to expend the costs to remove all the limitations from subscriber line transmission lines. Briefly described, in architecture, one embodiment of the apparatus, among others, can be implemented with logic to connect the apparatus to a loaded loop digital subscriber line and with logic configured to communicate over the digital subscriber line at a data rate greater than 28.8 kbps. Furthermore, the loaded subscriber loop may comprise at least one load coil, while the modulation used for communication may utilize bandwidth above the 0-4 KHz POTS baseband.

In addition, briefly described in architecture, one embodiment of the METHOD, among others, can be implemented by performing the steps of connecting digital subscriber line equipment to a loaded subscriber loop and of communicating over the digital subscriber line at a data rate greater than 28.8 kbps. Furthermore, the loaded subscriber loop may comprise at least one load coil, while the modulation used for communication may utilize bandwidth above the 0-4 KHz POTS baseband.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Various types of modulation and/or duplexing techniques can be used to overcome the limitations of load coils. By their nature, the low pass, frequency dependent filtering of load coils creates serious adverse effects on duplexing strategies that depend at least in part on frequency as well as on multiplexing strategies that depend on frequency separation to utilize a subscriber loop both for a basic native POTS interface in the 0-4 KHz POTS baseband together with the associated POTS signaling (such as but not limited to, POTS ringing, call waiting, calling line ID, and/or dual-tone multi-frequency (DTMF) or pulse/rotary dialing) and for DSL service. One skilled in the art will be aware of the differences between a native POTS interface on a subscriber access line or loop and a derived or synthesized voice call functionality that may be provided through a local POTS interface off of customer premises equipment (CPE) that connects to one or more digital channels or digital media on a digital subscriber access line or loop. One non-limiting example of such a derived or synthesized voice call functionality is the circuit-switched speech capability available from an analog POTS port on an ISDN BRI terminal adapter (TA) that utilizes a 64 kbps ISDN B-channel to carry digital pulse code modulation (PCM) samples over the digital subscriber access loop or line back to the line card. Other more current synthesized or derived digital voice technologies often utilize compressed and/or packetized encoding of human voice instead of the 64 kbps or 56 kbps DS0s. Many but not all customers prefer DSL service to be offered on the same access line/loop (or lines/loops) that supports a basic native POTS interface in the 0-4 KHz baseband because many customers often view basic POTS service as a lifeline of the bare minimum quality of connectivity that is expected to be available in all but the most catastrophic emergency conditions such as an earthquake or hurricane. Thus, a solution that provides faster digital service over a loaded subscriber loop together with a capability to support an analog POTS interface is important.

Figure 1:
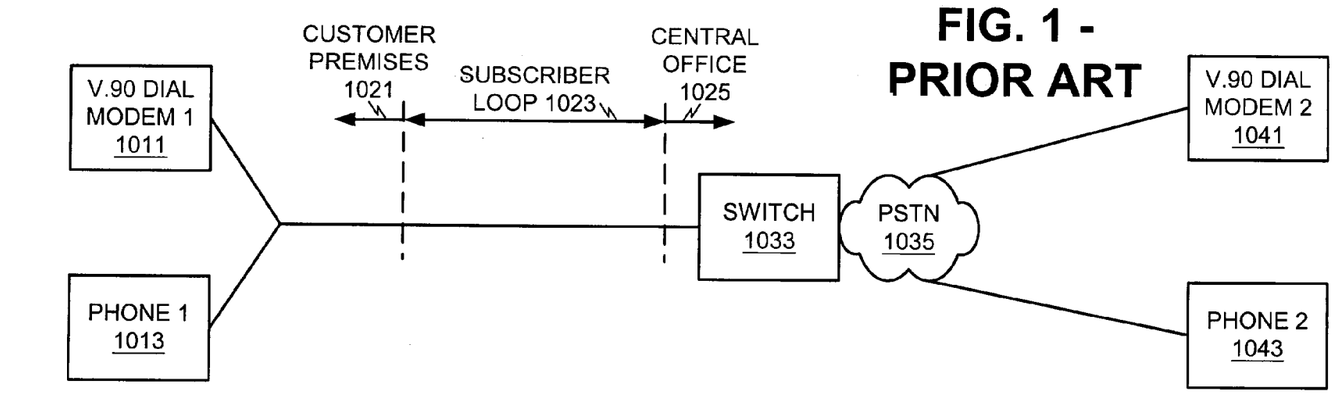
FIG. 1 is a block diagram showing V.90 modem communication over an unloaded subscriber loop.
Figure 2:
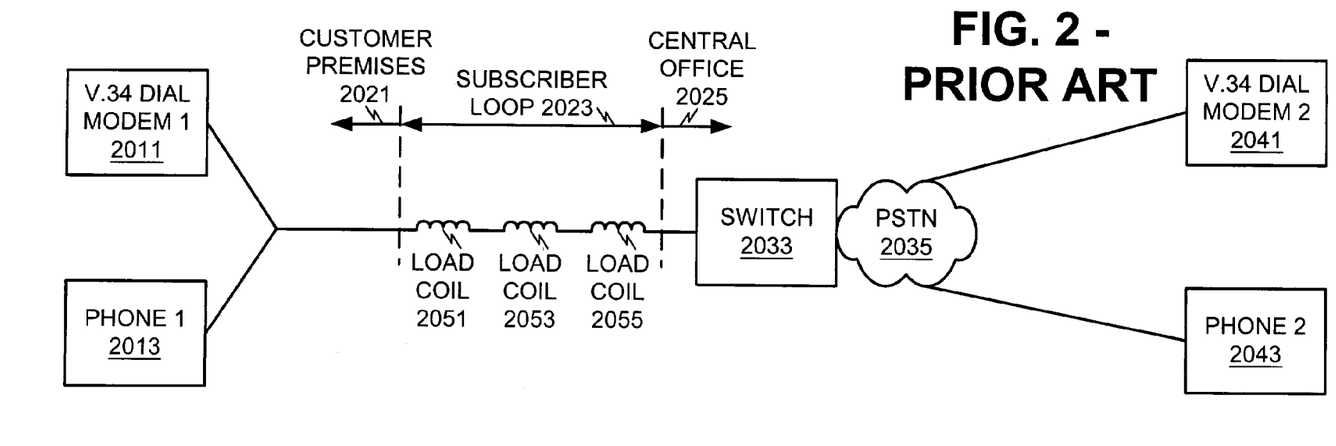
FIG. 2 is a block diagram showing V.34 modem communication over a loaded subscriber loop.
Figure 3:
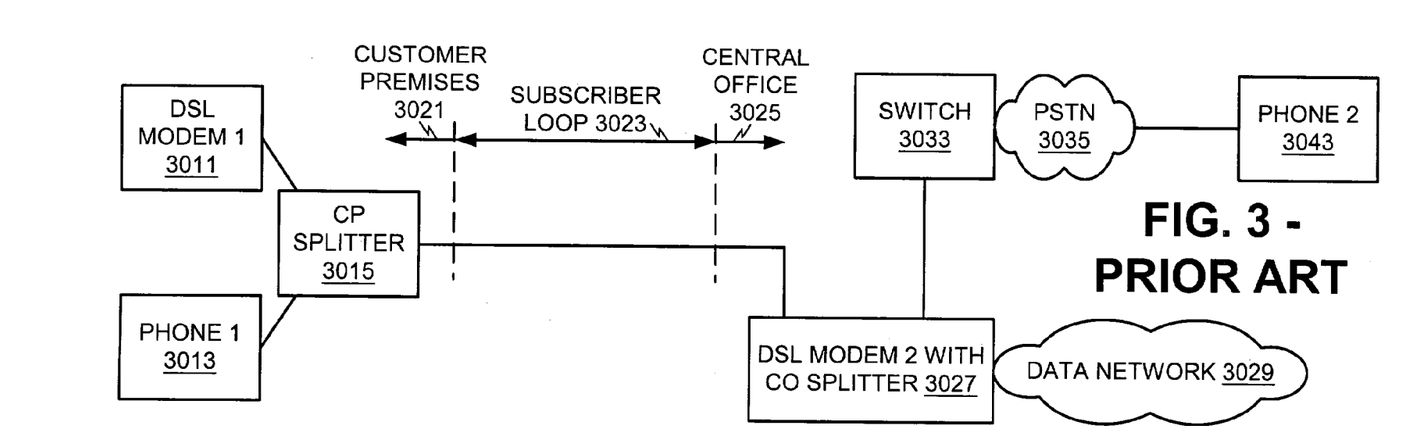
FIG. 3 is a block diagram showing DSL communication over an unloaded subscriber loop.

FIGS. 1, 2, and 3 show some existing ways of providing communications over subscriber loops. In FIG. 1, a first V.90 dial modem 1011 and a first analog POTS phone 1013 are connected to a subscriber loop 1023 that interfaces to a customer premises 1021 and to a central office 1025. (One skilled in the art will be aware that the line card used for network-side connections of subscriber loops also may be in a digital loop carrier cabinet instead of a central office.) For the circuit-switched communications commonly found in the public switched telephone network (PSTN), the central office (CO) usually contains a switch 1033 that is connected to the PSTN 1035, which usually further contains communication facilities such as, but not limited to, switches, trunks, and multiplexers. The PSTN 1035 is further connected to a second V.90 dial modem 1041 and a second analog POTS phone 1043. The configuration of FIG. 1 generally allows the subscriber loop 1023 to be used to support communication between the first V.90 modem 1011 and the second V.90 modem 1041 as well as communication between the first analog POTS phone 1013 and the second analog POTS phone 1043, although concurrent use of subscriber loop 1023 for the V.90 dial modem 1011 and the first analog POTS phone 1013 generally is not supported.

One skilled in the art will be aware that the V.90 modem standard generally is designed based upon expectations that the phone network will be digital and will convert analog POTS signals into 56 kbps or 64 kbps digital signals using various companding rules such as A-law or µ-law. One skilled in the art will be aware that the circuit-switched digital network of the PSTN uses POTS subscriber loop line cards that generally sample the POTS analog signal at the Nyquist rate of 8 KHz, which is two times the highest POTS baseband frequency of 4 KHz. With a sampling rate of 8 KHz and 8 bits per sample, the bit rate for digital calls through the PSTN is a maximum of 8 bits×8 KHz=8 bits/125 microseconds or 64 kbps. Thus, 64 kbps is the theoretical limit at which a modem can expect to communicate over a POTS interface that establishes digital speed 0 (DS0 or 56/64 kbps) calls through the PSTN. Given other limitations such as bit robbing for signaling, the maximum theoretical rate drops to 56 kbps.

With a high enough quality local loop, the V.90 standard can approach performance near 56 kbps downstream from the phone network to the customer premises of an analog loop, while the upstream performance from the customer premises to the network generally is based on the V.34 standard. Because the V.90 downstream modulation is based upon the quantized digital levels from 56 kbps or 64 kbps digital transmissions of A-law or µ-law pulse code modulation (PCM) samples, this modulation is often called "digital" modulation, while the modulation used in V.34 (including the upstream communication of a V.90 modem in V.90 mode) is often called "analog" modulation. (While this analog and digital modulation terminology is a useful short naming mechanism to distinguish the 56 kbps downstream modulation of V.90 from the 28.8 kbps or 33.6 kbps modulation of V.34, which is basically the same as the upstream modulation of V.90, applying the adjectives of "analog" and "digital" to differentiate the two different modulation schemes is somewhat inaccurate and misleading. Both modulation techniques generally involve discrete symbols at discrete instants of time determined by a symbol clock, which generally are characteristics of digital signals using a more accurate terminology.) When the performance of the subscriber loop is not up to the capability to support the V.90 digital modulation, many V.90 modems drop back to supporting communication using the V.34 standard for both the downstream and upstream directions of communication. The presence of load coils on a subscriber loop is one potential impediment that likely would diminish the capacity of the communications channel to operate in a V.90 mode. As a result, with a few load coils on a subscriber loop, the communication that occurs normally is limited to that available in V.34 (regardless of whether the V.34 communication is performed by V.34 modems or V.90 modems that have dropped back to V.34 mode).

FIG. 2 shows a first V.34 dial modem 2011 and a first analog POTS phone 2013 are connected to a subscriber loop 2023 that interfaces to a customer premises 2021 and to a central office 2025. (One skilled in the art will be aware that the line card used for network-side connections of subscriber loops also may be in a digital loop carrier cabinet instead of a central office.) For the circuit-switched communications commonly found in the public switched telephone network (PSTN), the central office (CO) usually contains a switch 2033 that is connected to the PSTN 2035, which usually further contains communication facilities such as, but not limited to, switches, trunks, and multiplexers. The PSTN 2035 is further connected to a second V.34 dial modem 2041 and a second analog POTS phone 2043. The configuration of FIG. 2 generally allows the subscriber loop 2023 to be used to support communication between the first V.34 modem 2011 and the second V.34 modem 2041 as well as communication between the first analog POTS phone 2013 and the second analog POTS phone 2043, although concurrent use of subscriber loop 2023 for the V.34 dial modem 2011 and the first analog POTS phone 2013 generally is not supported. In contrast to FIG. 1, FIG. 2 shows how V.34 modems 2011 and 2041 can be used over a subscriber loop 2023 that has at least one load coil arbitrarily shown as load coils 2051, 2053, and 2055. Because of the load coils 2051, 2053, and 2055, V.90 communication generally is not possible over subscriber loop 2023.

FIG. 3 shows a common digital subscriber line (DSL) deployment. Although some DSL line technologies such as, but not limited to, ISDN (Integrated Services Digital Network) Basic Rate Interface (BRI) and Primary Rate Interface (PRI) access lines as well as High bit-rate Digital Subscriber Lines (HDSL) generally utilize the POTS 0-4 KHz baseband, some other DSL technologies including, but not limited to, Asymmetric Digital Subscriber Line (ADSL) are frequency-division multiplexed above the 0-4 KHz POTS baseband to allow DSL communication, while still natively supporting a POTS communication interface on the subscriber loop. The 2B 1Q (2 Binary, 1 Quaternary) U-Interface of BRI ISDN generally was one of the early attempts to provide customers with a digital subscriber loop to access the digital services in the telco network. However, the U-Interface of BRI ISDN utilizes a frequency spectrum from 0 KHz to 80 KHz at the 3 dB half-power point. Thus, the 2B1Q U-Interface of BRI ISDN overlaps the 0-4 KHz POTS baseband, such that the standard BRI ISDN access loop generally does not allow the simultaneous delivery over a subscriber loop of a standard POTS interface that includes powering for standard POTS phones. As a result, ISDN BRI subscribers usually lose even basic circuit-switched speech calling functionality when ISDN customer premises equipment (CPE) loses a local power source that provides power to the electronics of an ISDN BRI terminal adapter (TA) supporting circuit-switched voice. ADSL addressed some of the issues in providing the basic POTS services for making voice calls during emergencies and other situations by frequency-division multiplexing the DSL service above the 0-4 KHz POTS baseband. Thus, even if the electronics in ADSL CPE fail during a power outage at the customer premises, the local loop generally still might provide the powering needed for POTS service on basic POTS phones to complete basic voice telephone calls during an emergency.

In FIG. 3 a first DSL modem 3011 and a first analog POTS phone 3013 are connected to a customer premises (CP) POTS splitter 3015. As one skilled in the art will be aware, the POTS splitter 3015 performs functions to facilitate the frequency-division multiplexing (FDM) of DSL service above the 0-4 KHz POTS baseband. The CP POTS splitter 3015 is connected to the subscriber loop 3023 that interfaces to a customer premises 3021 and to a central office 3025. (One skilled in the art will be aware that the line card used for network-side connections of the POTS functionality on subscriber loops also may be in a digital loop carrier cabinet instead of a central office.) On the central-office or network-side of a DSL subscriber loop 3023, the loop is normally connected to a second DSL modem with a central office (CO) splitter 3027. One skilled in the art will be aware that the CO splitter may or may not be integrated within the CO-side or network-side DSL modem 3027. Also, one skilled in the art will be aware that multiple network-side DSL modems such as the second DSL modem with CO splitter 3027 may be combined into a digital subscriber line access multiplexer (DSLAM). Normally, the second DSL modem with CO splitter 3027 (i.e., the CO-side modem) is connected to a data network 3029, with the data network 3029 generally offering some form of packet-switched service using statistical multiplexing.

Also, the second DSL modem with CO splitter 3027 connects to switch 3033 (or to a DLC) to support the basic 0-4 KHz POTS interface on the subscriber line 3023. For the circuit-switched communications commonly found in the public switched telephone network (PSTN), the central office (CO) usually contains the switch 3033 that is connected to the PSTN 3035, which usually further contains communication facilities such as, but not limited to, switches, trunks, and multiplexers. The PSTN 3035 is further connected to a second analog POTS phone 3043.

Commonly the data network 3029 provides some form of statistically multiplexed packet service using protocols such as, but not limited to, X.25, frame relay, ATM (asynchronous transfer mode), and/or IP (Internet Protocol), while the PSTN 3035 has historically been a circuit-switched network. As one skilled in the art will be aware, in a general context packet switching encompasses various statistical multiplexing techniques including, but not limited to, connection-oriented virtual circuit packet switching (which in the more specific context of X.25, frame relay, and ATM generally is respectively called packet switching, frame switching, and cell switching) as well as connectionless datagram packet switching (such as but not limited to IP switching and/or routing). Furthermore, the label switching of technologies such as, but not limited to, multi-protocol label switching (MPLS) (and also X.25, frame relay, and ATM) is a form of packet-switching. In addition, one skilled in the art will be aware that the data service provided over DSL might use other technologies such as but not limited to the point-to-point protocol (PPP) and/or ethernet instead of or in addition to X.25, frame relay, ATM, IP, and/or MPLS. Thus, although the data network 3029 commonly may be frame relay, ATM, and/or IP, the preferred embodiments of the present invention are not intended to be so limited.

Also, one skilled in the art will be aware of using circuit-switched networks to carry information flows with the bursty characteristics of computer data communications as well as using packet-switched networks to carry information flows with the real-time delay constraints of voice and video. Thus, although the PSTN as shown in FIGS. 1-5 has historically been a circuit-switched network, one skilled in the art will be aware that the concepts of the preferred embodiments of the present invention also will work if the PSTN or portions thereof are converted to packet-switching technologies. In addition, for efficiency reasons the data networks in FIGS. 3-6 generally are implemented as packet-switching networks, but one skilled in the art will be aware that the concepts of the preferred embodiments of the present invention also apply if the data networks in FIGS. 3-6 utilize leased lines and/or circuit switching in place of or in addition to packet switching. Thus, the PSTN clouds in FIGS. 1-5 and the data networks in FIGS. 3-6 are not to be limited to the historical implementations of these networks as circuit-switching networks and packet-switching networks respectively.

Figure 4:
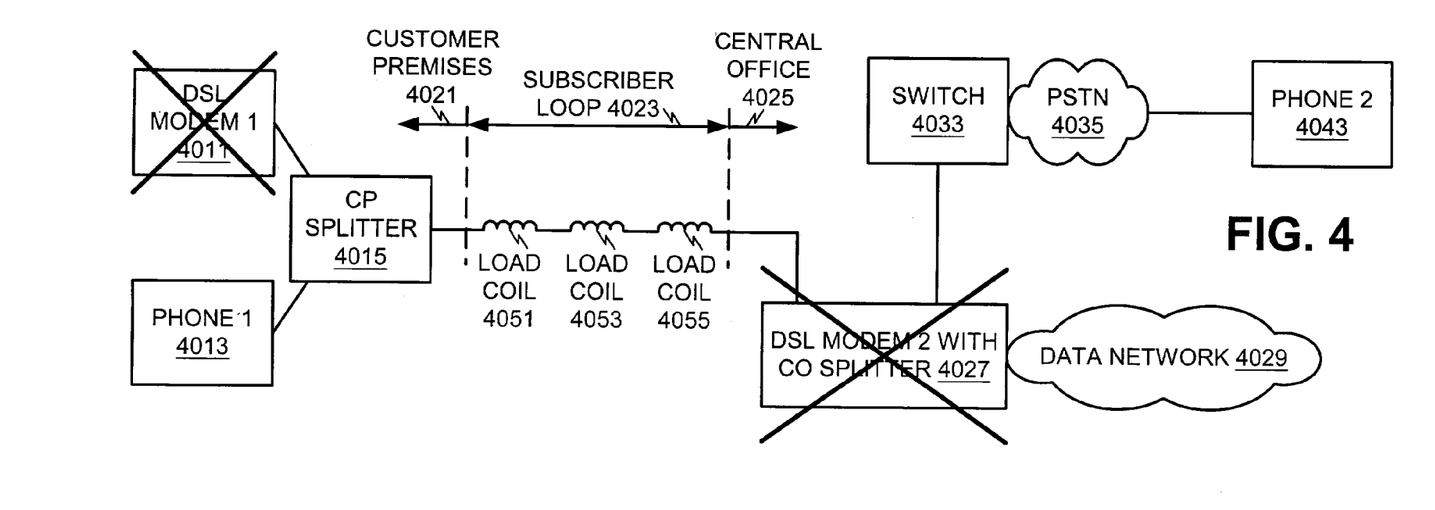
FIG. 4 is a block diagram showing that DSL communication using common DSL technologies generally is not functional over a loaded subscriber loop.

FIG. 4 is similar to FIG. 3; however, FIG. 4 includes a loaded subscriber loop. In FIG. 4 a first DSL modem 4011 and a first analog POTS phone 4013 are connected to a customer premises (CP) POTS splitter 4015. As one skilled in the art will be aware, the POTS splitter 4015 performs functions to facilitate the frequency-division multiplexing (FDM) of DSL service above the 0-4 KHz POTS baseband. The CP POTS splitter 4015 is connected to the subscriber loop 4023 that interfaces to a customer premises 4021 and to a central office 4025. (One skilled in the art will be aware that the line card used for network-side connections of the POTS functionality on subscriber loops also may be in a digital loop carrier cabinet instead of a central office.) On the central-office or network-side of a DSL subscriber loop 4023, the loop is normally connected to a second DSL modem with a central office (CO) splitter 4027. One skilled in the art will be aware that the CO splitter may or may not be integrated within the CO-side or network-side DSL modem 4027. Also, one skilled in the art will be aware that multiple network-side DSL modems such as the second DSL modem with CO splitter 4027 may be combined into a digital subscriber line access multiplexer (DSLAM). Normally, the second DSL modem with CO splitter 4027 (i.e., the CO-side modem) is connected to a data network 4029.

Also, the second DSL modem with CO splitter 4027 connects to switch 4033 (or to a DLC) to support the basic 0-4 KHz POTS interface on the subscriber line 4023. For the circuit-switched communications commonly found in the public switched telephone network (PSTN), the central office (CO) usually contains the switch 4033 that is connected to the PSTN 4035, which usually further contains communication facilities such as, but not limited to, switches, trunks, and multiplexers. The PSTN 4035 is further connected to a second analog POTS phone 4043. Unlike FIG. 3, subscriber loop 4023 in FIG. 4 includes at least one load coil arbitrarily shown as load coils 4051, 4053, and 4055. Unfortunately, using today's common DSL technologies, the operation in FIG. 4 over loaded subscriber loop 4023 with load coils 4051, 4053, and 4055 is not possible as indicated by the cross-outs of the DSL modems 4011 and 4027.

As described previously, the load coils generally act as low-pass filters that generally prohibit the use of DSL over loaded loops. This problem is especially inhibiting for DSL technologies utilizing some form of frequency-division duplexing (FDD), which generally uses one frequency band for one direction of communication and another frequency band for the other direction of communication to support the bi-directional communication of DSL. Necessarily, such use of frequency-division duplexing results in at least part of the channel for one direction of communication being at a higher frequency range than the channel for the other direction of communication. To the extent that the frequency channel for one or both of the directions of FDD communication is outside or above the pass-band for the low pass filter of the load coils, the load coils will significantly degrade the frequency-division duplexed communications performance. Furthermore, DSL technologies, such as but not limited to ADSL, generally operate using at least the frequencies that are higher than the POTS baseband. Thus, load coils that create a low pass filter with a pass-band of the 0-4 KHz POTS baseband generally prohibit DSL technologies from operating. In addition, some DSL technologies, such as but not limited to ADSL, are designed to be frequency-division multiplexed (FDM) above a POTS baseband to allow the same local loop to also carry a basic POTS interface in the 0-4 KHz baseband frequencies. These DSL technologies that are frequency division multiplexed (FDM) above POTS are especially susceptible to the impediments of the low pass filtering from load coils, which generally were purposely designed to have a pass band for carrying the historical 0-4 KHz POTS baseband. Thus, the operation in FIG. 4 generally is not possible.

In one narrow exception, Paradyne's current ReachDSL technology is capable of operating at a significantly reduced connection rate over a short local loop (usually less than about 15 Kft.) containing just a single load coil. In general, a single load coil on a loop occurs when a loop has been improperly designed (e.g., the coil was left on by mistake). RBOCs have statistics indicating that such improperly designed loops occur in about 1% of the deployed loops. A single coil on a local loop is not desireable because it reduces return loss and causes worse voice-frequency roll-off. However, at ReachDSL frequencies a single load coil causes less of a severe roll-off than for a properly loaded loop. This advantage of ReachDSL permits limited DSL coverage on a small number of loops that are misloaded and fall within the distance limitations. This ability of ReachDSL to work in the limited special circumstances of a single load coil and short distance loop can help to save a phone company from dispatching a technician to remove the load coil from the misloaded loop. Generally, if the DSL service provider is required to offer DSL service to customers on loops longer than about 15 Kft., which have a single load coil, or if the reduction in connection rate is not acceptable, then even ReachDSL will not work sufficiently on loops with a single load coil. Even with this limited exception of Paradyne's ReachDSL technology working at a reduced rate with a single load coil on short distance loops, in general DSL technologies do not operate over loops with load coils, and no DSL technologies are known to operate over subscriber loops with two or more load coils.

As suggested previously, one technical solution to the communications problems in FIG. 4 is to redesign, reengineer, and/or redeploy the subscriber loop 4023 by removing the load coils 4051, 4053, and 4055, which eliminates the problems. However, for economic and business reasons such a solution may not be an efficient use of resources. A technical solution that allows some level of DSL communication performance greater than that provided for by V.34 modems without having to expend the economically costly resources in removing the load coils from a loop or deploying a new unloaded loop to a customer premises is preferable.

The preferred embodiments of the present invention offer some possible solutions to this economic/technical problem of loaded subscriber loops. In general, using different modulation and/or duplexing techniques than usual DSL deployments allows service providers to offer a DSL-quality service that outperforms V.34 modems on loaded loops. Unlike the frequency-dependent nature of frequency-division duplexing, which is adversely affected by frequency-dependent filtering such as the low-pass filtering from load coils, time division duplexing (TDD) generally shares a communications medium or a channel in a communications medium by allowing one direction of communication to utilize the medium or channel for a part of the time with the other direction of communication generally utilizing the medium or channel for the other part of the time to support the two directions of bidirectional communications. One skilled in the art will be aware of the basic concepts of TDD. Furthermore, time division duplex does not have to necessarily allocate fixed or static amounts of time to each direction of communication. Also, even with fixed or static allocations of time, the allocations do not have to have a 50%-50% even allocation to each direction of communication. Normally, the technique of dynamically or adaptively varying the time allocation for each direction of communication in time-division duplexing is known as adaptive time-division duplexing (ATDD).

Generally, TDD and/or ATDD involve a first device transmitting (without receiving) during a first time interval while the second device is only receiving and not transmitting during that first time interval. Then, during a second time interval that is essentially non-overlapping with the first time interval, the second device generally transmits without receiving while the first device generally receives without transmitting. In addition, although TDD/ATDD generally is viewed with respect to duplexing support for bi-directional communications between two devices with a point-to-point relationship, TDD/ATDD also can be used in multi-point configurations with three or more devices. A further description of TDD and/or ATDD may be found in U.S. patent application Ser. No. 10/420,204, entitled "Extended-Performance Echo-Cancelled Duplex (EP ECD) Communication", and filed on Apr. 22, 2003, which is incorporated by reference in its entirety herein.

In addition to describing TDD and ATDD, the "Extended-Performance Echo-Cancelled Duplex (EP ECD) Communication" patent application with U.S. Ser. No. 10/420,204 describes another duplexing technique that may be called extended-performance echo-cancelled duplex (EP ECD). Like TDD and ATDD, EP ECD generally utilizes at least two modes of essentially non-overlapping intervals of time. Also like TDD/ATDD, in EP ECD signal levels generally are adjusted in switching between and/or among the modes of EP ECD. However, each time interval mode of EP ECD does allow some concurrent transmission and reception by EP ECD devices through the use of echo cancellation technology. One skilled in the art will be aware that echo cancellation generally operates by a receiver in a first device summing up delayed and attenuated versions of the transmit signal from the first device to obtain an estimate of the echo at the receiver in the first device. This estimate of the received echo is then subtracted from the signal received at the first device to better estimate the originally transmitted signal from a second device that is in communication with the first device. Using different signal levels during essentially different non-overlapping intervals of time together with echo cancellation allows improved performance of EP ECD over both pure TDD/ATDD and pure echo cancelled duplex (ECD) for some types of channel characteristics. The adjustment of signal levels in EP ECD adjusts not only the signal levels of transmitted and received information, but also the signal level of received echo. Because echo cancellation technology does not perfectly estimate the echo received, some residual echo noise still exists in incoming signals that is the result of the echoes together with the imperfect echo cancellation. Thus, the adjustment of signal level in switching between and/or among modes of EP ECD adjusts the transmit and receive information signal levels as well as the residual echo noise signal level. In EP ECD, adjusting the signal level as well as adjusting the noise level changes the signal-to-noise ratio, which generally is related to channel capacity by the channel information encoding capacity theories that are primarily attributable to Claude Shannon of which one skilled in the art will be aware.

Furthermore, standard operating practice for some time at telephone companies has been to initially wire most residences with two local loops or two pairs of wires for a total of four wires. One skilled in the art will be aware that four-wire duplexing is another duplexing technique that can be used when enough conductors are available. Four-wire duplexing may involve using different conductors for different directions of signal propagation. On a balanced interface with four-wire duplexing, one pair of wires commonly is used for transmitting, while another pair of wires commonly is used for receiving, with the two pairs being a total of four wires. On an unbalanced interface, such as but not limited to RS-232, three wires may be used with one for transmit, one for receive, and a common signal ground. Thus, by carrying the signals for different directions of propagation on different conductors or media, RS-232 is a form of "four-wire duplexing" that actually uses just three wires in an unbalanced interface. Using four-wire duplexing instead of frequency-division duplexing to support digital subscriber line service would provide better performance behavior on loops with load coils. Furthermore, if additional loops are available, these loops also may be multiplexed together in offering digital service over three or more pairs of wires. As used herein, four-wire duplexing will include using at least three wires (and preferably at least two pair or at least four wires) to a customer premises. Duplexing techniques such as TDD/ATDD, EP ECD, and four-wire duplexing can be used with modulation techniques such as, but not limited to, pulse amplitude modulation (PAM), Discrete Multi-Tone (DMT) modulation, and carrierless amplitude-phase (CAP) modulation as well as quadrature amplitude modulation (QAM).

As a particular example of the performance limitations of loops with load coils or loaded loops, attenuation on a 18 Kft AWG (American Wiring Gauge) 24 loaded loop starts to rapidly increase above 3300 Hz and reaches 50 dB of attenuation at around 6 KHz. In contrast, on a 18 Kft AWG 24 unloaded loop, attenuation generally does not reach 50 dB until about 100 KHz. Thus, the 50 dB loss point bandwidth on a loaded loop is about 6 KHz/100 KHz=0.06 that of an unloaded loop. Utilizing this loaded loop bandwidth between 4 KHz and 6 KHz generally is impractical for communications technologies such as V.34 that primarily utilize echo cancellation for duplexing. Such echo cancellation generally has a practical noise floor for eliminating echo noise of around 60 dB or less. Since the received signal level at 6 KHz has been attenuated 50 dB and since the echo canceller noise floor is 60 dB below the transmit level, the resultant signal-to-noise ratio at 6 KHz is 10 dB, which is a value so low as to prohibit effective communication. Thus, load coils make it impractical to use the common frequency-division duplexing techniques of ADSL as well as the pure echo-cancellation techniques of V.34 to maximize communications performance over the loaded subscriber loop. To obtain performance better than the 28.8 kbps or 33.6 kbps of V.34 over loaded subscriber loops, a new configuration is needed.

Figure 5:
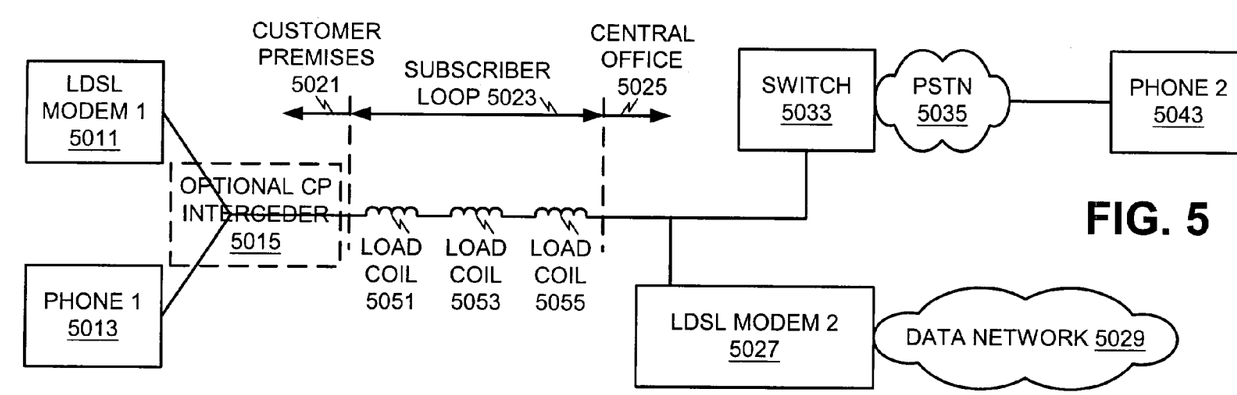
FIG. 5 is a block diagram showing that loaded loop DSL communication is possible over a loaded subscriber loop using various modulation and/or duplexing technologies.

FIG. 5 shows a potential solution to the problems of DSL communication over loaded loops that was shown in FIG. 4. In FIG. 5, a first loaded loop DSL (LDSL) modem 5011 and a first analog POTS phone 5013 are connected to an optional customer premises (CP) interceder 5015 that generally is located at customer premises 5021. Because the CP interceder 5015 is optional, the first loaded loop DSL (LDSL) modem 5011 and the first analog POTS phone 5013 may just be bridged together onto the subscriber loop 5023, which provides further connectivity to a central office 5025 (or a DLC). A CP interceder 5015, which is optional in FIG. 5, generally is placed in series with a subscriber loop 5023 and is connected between POTS equipment such as the first analog POTS phone 5013 and DSL equipment such as the first LDSL modem 5011. A CP interceder 5015 generally functions to disconnect and isolate the POTS equipment from the subscriber line when the POTS equipment is not in use and generally functions to disconnect and isolate the DSL equipment from the subscriber line when the DSL equipment is not in use. When POTS is not being used across subscriber loop 5023, an optional CP interceder 5015 can be used to increase DSL data rates by reducing the non-linear distortion effects of on-hook POTS equipment, such as but not limited to first analog POTS phone 5013. Unlike other DSL solutions, the preferred embodiments of the present invention may utilize the same 0-4 KHz frequency baseband as POTS without requiring a CP interceder 5015. A CP interceder 5015 may provide some additional performance benefits in isolating the subscriber loop 5023 from some analog POTS equipment such as the first analog POTS phone 5013 to reduce various distortions caused by the analog POTS equipment during the time that DSL communications are using the 0-4 KHz POTS baseband. Also, a CP interceder 5015 may provide some additional performance benefits in isolating the subscriber loop 5023 from some DSL equipment such as the LDSL modem 5011 to reduce various distortions caused by the DSL equipment during the time that analog POTS communications are using the 0-4 KHz POTS baseband. However, a CP interceder 5015 is optional, and the preferred embodiments of the present invention will work without the presence of such an optional CP interceder 5015.

The use of various duplexing techniques such as but not limited to TDD/ATDD and 4-wire (or at least three wire) duplexing allows fast training that makes it practical for the first LDSL modem 5011 to quickly switch between using the 0-4 KHz baseband to support POTS service and using a frequency range such as, but not limited to, 0-6 KHz, which overlaps the POTS baseband and generally goes above the POTS baseband associated with the corresponding general passband of the load coils, to support DSL service. Normally, echo-cancellation generally requires more delay in training such that pure echo-cancelled duplex is not a good solution for DSL service over loaded loops. Furthermore, the training for echo cancellation used in EP ECD may not need to be as long as the echo cancellation used in pure echo cancelled duplex because, like TDD/ATDD, EP ECD also varies signal levels during essentially non-overlapping intervals of time. Thus, in addition to TDD/ATDD and four-wire duplexing, EP ECD may be another reasonable candidate for a duplexing strategy that can rapidly adapt to changes in the state of POTS usage of the subscriber line. Although EP ECD uses echo cancellation as at least part of the duplexing technique, because the duplexing technique in EP ECD is not solely based on echo cancellation, the echo cancellation in EP ECD may not have to be as accurate as the echo cancellation of pure echo cancelled duplex. Less accurate echo cancellation generally may be able to operate with shorter training times than echo cancellation that has to be more accurate because echo cancellation generally is the only technology used for duplexing in pure echo cancelled duplex.

Thus, using duplexing techniques of TDD/ATDD, four-wire duplexing, and/or EP ECD, the first LDSL modem 5011 can communicate over a loaded subscriber loop 5023 to a second LDSL modem 5027 that provides connectivity to data network 5029, which commonly is a packet-switched network but is not necessarily limited to packet switching. In a non-limiting example, the communications between first LDSL modem 5011 and second LDSL modem 5027 may utilize the 0-6 KHz range on a loaded subscriber loop 5023 that is arbitrarily shown with three load coils 5051, 5053, and 5055. In addition to supporting DSL service over a loaded loop, the preferred embodiments of the present invention also allow for analog POTS service between the first analog POTS phone 5013 and the second analog POTS phone 5043 over loaded subscriber loop 5023 and through switch 5033 and PSTN 5035. One skilled in the art will be aware that other types of access lines such as, but not limited to, an ISDN BRI can also terminate and initiate circuit-switched voice or speech calls in addition to second analog POTS phone 5043. Also, as stated previously, one skilled in the art will be aware that data network 5029 and PSTN 5035 may be implemented using other technologies than the common historical implementations of packet switching and circuit switching respectively.

By using a duplexing technique such as TDD/ATDD, four-wire duplexing, and/or EP ECD, the configuration of FIG. 5 can effectively utilize the bandwidth within the POTS baseband and at frequencies above the POTS baseband on a loaded subscriber loop 5023 plus those various duplexing technologies can quickly and rapidly startup and stop to allow the loaded subscriber loop 5023 also to be used for analog POTS phone calls and POTS signaling messages. In FIG. 5, the deployment of LDSL modems 5011 and 5027 at the customer premises 5021 and central office 5025 (or DLC) allows potentially higher performance over a loaded subscriber loop 5023 that would be available through V.34 modems that are designed for communicating data through the PSTN 5035. Also, the communications between LDSL modems 5011 and 5027 might well be faster than the V.90 modem communications that generally are limited to a maximum DS0 speed of 56 kbps that is carried through the PSTN 5035. As shown in FIG. 5, the second LDSL modem 5027 is connected in parallel with the CO switch 5033 such that DSL communications need not go through the PSTN 5035, which currently limits calls to 64 kbps DS0s. Thus, the configuration of FIG. 5 allows potentially better data communications service than is currently available through V.34 and V.90 modems, and also is capable of operating over a loaded subscriber loop 5023 with at least one load coil and even operating with a plurality of load coils such as, but not limited to, load coils 5051, 5053, and 5055.

Thus, the preferred embodiments of the present invention allow for communications over loaded loops at data rates above the 28.8 kbps and/or 33.6 kbps of V.34 and may also allow performance exceeding a DS0 rate of 56 kbps and/or 64 kbps. To achieve this performance the bandwidth above 4 KHz POTS baseband is capable of being utilized between LDSL modems 5011 and 5027 with the preferred embodiments utilizing the frequency bandwidth from approximately 0-6 KHz and higher. However, the embodiments of the present invention do not require that the bandwidth above 4 KHz is utilized.

Also, one skilled in the art will be aware that various standards and regulatory bodies have developed electromagnetic emissions standards to reduce and mitigate the interference from one electromagnetic phenomena on another electromagnetic phenomena. With particular respect to local loop telephone wiring, the North American Spectrum Management Standards provide limitations to reduce the effect that electromagnetic waves on one wire pair induce onto another wire pair in the same multi-pair cable. For V.34, the typical power spectral density (PSD) is about −45 dBm/Hz at a bandwidth of 3200 Hz, while the common DSL standards allow 16 dB higher than V.34 for 29 dB/Hz in both directions. The PSD for the LDSL modems 5011 and 5027 in FIG. 5 may be adjusted based on the number of load coils, subscriber loop length, and/or wiring gauge. Also, the PSD for LDSL modems 5011 and 5027 may be set to higher levels than the current V.34 technology that operates over load subscriber loops, while still staying within the PSD requirements for other modulation schemes that are used in other DSL technologies, which are compliant with the North American Spectrum Management Standards. However, the preferred embodiments of the present invention do not require that the PSD for LDSL modems 5011 and 5027 be higher than the V.34 PSD. In addition, the preferred embodiments of the present invention are capable of using relatively large bits/Hz signaling densities with relatively low bit error rates based on the signal-to-noise ratios available from using TDD/ATDD, four-wire duplexing, and/or EP ECD. Also, various techniques of TDD and/or ATDD as utilized in Paradyne's MVL and ReachDSL products can be applied to LDSL modems 5011 and 5027 to allow seamless rate adaptation, power level adaptation, rapid sensing of various channel parameter changes and resulting transceiver adaptations.

Furthermore, the rapid startup and stop times of the duplexing and modulation strategies of the preferred embodiments of the present invention, allow the same loaded subscriber loop 5023 to support DSL service and POTS service. The quick start and stop times of the duplexing and modulation techniques in the preferred embodiments of the present invention allow the DSL service to be temporarily interrupted for short periods to communicate various types of POTS signaling such as ringing voltage, customer premises POTS phone off-hook signals, central office MLT (mechanized loop testing), and/or CO-based CLASS (Custom Local Area Signaling Services) service events such as, but not limited to, call waiting and calling name and/or number identification (calling line ID or CLID). In some instances the startup training times can be as low as 15 milliseconds. Thus, the DSL communication can be stopped for a short interval to allow POTS signaling, and then the DSL communication can be resumed in as short as 15 msecs. after the end of the POTS signaling. In many cases, such small stoppages of data communication will be transparent to end user applications.

Also, end user policy decisions can be statically configured in the equipment to specify preferences when POTS phone calls should interrupt DSL communications for longer durations. Also, such decisions could be dynamically made by the end user based on the importance of particular phone calls. As a non-limiting example, an end user might be using the local loop 5023 for DSL communication to download a file. If the switch 5033 has an incoming circuit switched voice call for the end user's telephone number, the DSL communication may be temporarily stopped while the switch 5033 provides POTS ringing signals and calling line ID signals. Based on the CLID of the incoming call, the end user can decide whether to answer the call and potentially halt the DSL communications for a more significant amount of time or allow the call to be forwarded by the PSTN 5035 on a busy/no-answer condition to a voice mail system. Also, another non-limiting example of a policy decision may be to never allow incoming POTS calls to interrupt DSL communications while always allowing outgoing POTS calls to interrupt DSL communications. One skilled in the art will be aware of other common priority preferences that users may develop to decide policies as to when a voice call should interrupt DSL communications for a more significant amount of time. In general, CPE can be developed to implement various potential user policies on situations where analog POTS service should take priority over DSL service for use of the subscriber loop 5023, and the CPE also can be developed to allow users to define their own policy preferences.

Figure 6:
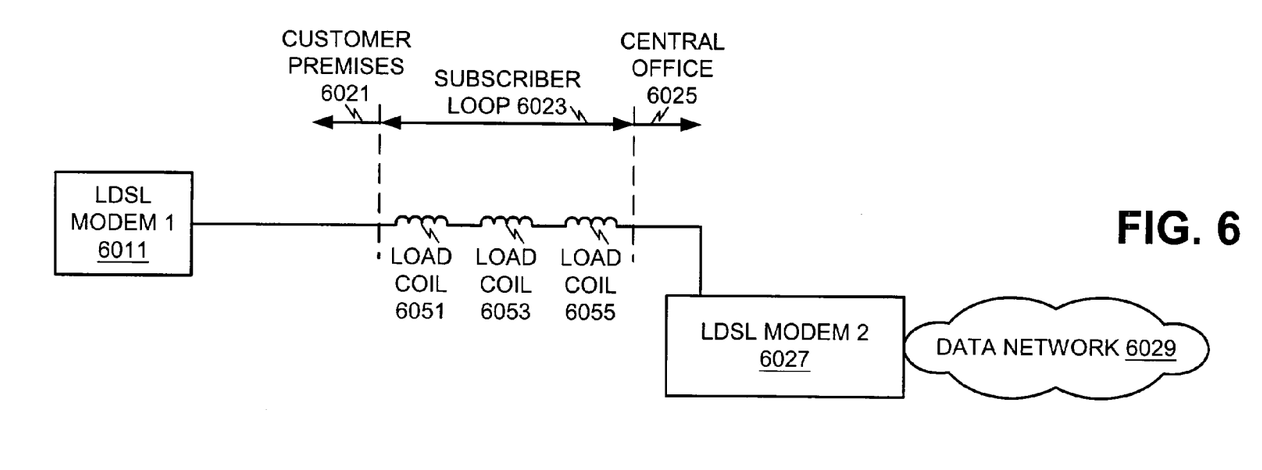
FIG. 6 is a block diagram showing that loaded loop DSL communication over a loaded subscriber loop using various modulation and/or duplexing technologies is also possible in the absence of a native POTS interface on the subscriber access line or loop.

While the preferred embodiments of the present invention support POTS usage of the same subscriber loop 5023 as shown in FIG. 5, FIG. 6 displays another potential configuration where support for a native POTS interface in the 0-4 KHz baseband is not required. The technologies of the preferred embodiments of the present invention are capable of operating on a subscriber loop that does not need to support POTS. Thus, FIG. 6 displays a first loaded loop DSL (LDSL) modem 6011 connected to a subscriber loop 6023 between a customer premises 6021 and a central office 6025 (or DLC). On the network-side or CO-side, the subscriber loop 6023 is connected to a second LDSL modem 6027, which is further connected to data network 6029 that commonly is a packet switched network, but is not necessarily limited to just packet switching networks. In FIG. 6, subscriber loop 6023 has at least one load coil as arbitrarily exemplified in FIG. 6 by load coils 6051, 6053, and 6055. The configuration in FIG. 6 may arise when two pairs have been wired to a customer premises under standard telephone company operating procedure. One pair may be used for standard POTS service, while the second pair may be used just for DSL service without a native POTS interface. One skilled in the art will be aware of many methods of providing a derived POTS interface using the DSL bandwidth portion of a subscriber line to supply digital voice to customers. In an ISDN BRI access line, such derived POTS service generally utilized an ISDN B-channel to support circuit-switched voice. While DSL technologies also are capable of providing standard A-law or μlaw digitized PCM voice over the DSL bandwidth for connection as a circuit-switched voice call, more commonly various packetized and compressed digital voice technologies such as, but not limited to, VoDSL (Voice over DSL), VoIP (Voice over IP), VoFrame (Voice over Frame Relay), and/or VoATM (Voice over ATM) are used to provide a synthesized voice service over a DSL line. Usually such packetized voice technologies that travel over data network 6029 are connected to the circuit-switched PSTN through gateways that convert between the packetized voice formats and associated signaling and the standard A-law or μ-law digitized PCM DS0 voice and associated signaling. One skilled in the art will be aware of various technologies and configurations for supplying a derived or synthesized voice service over the bandwidth used for DSL communications as well as various architectures for interworking packetized voice with the circuit-switched PSTN. Also, because the configuration of FIG. 6 does not need to stop and start DSL communication due to native POTS interface signaling and phone calls, EP ECD may provide a better duplexing choice than TDD/ATDD. EP ECD may have slightly longer training times than TDD/ATDD, but the training times of EP ECD may not be as long as pure ECD. However, in the absence of starting and stopping DSL communications to support native POTS interface signaling, the additional time delays for training may be less significant of an issue. As already mentioned, EP ECD can offer higher bidirectional performance than either pure TDD/ATDD or pure ECD over some ranges of channel characteristics.

Thus, the preferred embodiments of the present invention provide advances over the existing V.34 technology for loaded loop communication and allow deployment of DSL technology at higher communication rates without the need for reengineering subscriber loops to remove load coils. For example, some non-limiting typical data rates using the preferred embodiments of the present invention might start at around 64 kbps and go to 384 kbps and above on loaded subscriber loops with a startup time of around one second and a shutdown time of several milliseconds. Such a solution allows telecommunications service providers to offer higher grade service to additional customers without absorbing the costs to rewire the multitude of loaded subscriber loops in the networks of service providers. Furthermore, the preferred embodiments of the present invention will work using TDD/ATDD, four-wire duplexing over more than two wires, and EP ECD with various modulation techniques.

It should be emphasized that the above-described preferred embodiments of the present invention, particularly, any "preferred" preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and are to be protected by the following claims.

Therefore, having thus described the invention, at least the following is claimed:

1. A digital subscriber line (DSL) appratus, the apparatus comprising:
    logic configured to connect the digital subscriber line apparatus to a first subscriber loop that comprises a plurality of low-pass load coils configured to filter out frequencies above a POTS band; and
    logic configured to provide digital subscriber line communication at a bit rate greater than 28.8 kbps over the first subscriber loop, said communication utilizing frequencies below 4 kHz,
    said communication utilizing adaptive time division duplexing (ATDD) that adjusts time durations for each direction of communication based on data demand.

2. The apparatus of claim 1, wherein the communication further occurs at a bit rate greater than 33.6 kbps.

3. The apparatus of claim 2, wherein the communication further occurs at a bit rate greater than 56 kbps.

4. The apparatus of claim 1, wherein the digital subscriber line communication additionally uses frequencies above 4 kHz.

5. The apparatus of claim 1, wherein the adaptive time division duplexing adjusts a relative percentage of time used for each direction of communication during initial startup of communication.

6. The apparatus of claim 1, wherein the digital subscriber line communication utilizes at least one modulation selected from the group consisting of: pulse amplitude modulation (PAM), discrete multitone (DMT) modulation, carrierless amplitude-phase (CAP) modulation, and quadrature amplitude modulation (QAM).

7. A method of providing digital subscriber line (DSL) service, the method comprising the steps of:
    connecting digital subscriber line equipment supporting digital subscriber line communication over a first subscriber loop that comprises a plurality of low-pass load coils configured to filter out freguencies above the POTS band; and
    communicating, utilizing frequencies below 4 kHz, at a bit rate greater than 28.8 kbps over the first subscriber loop,
    wherein the digital subscriber line communication uses extended performance echo cancelled duplexing (EP ECO), wherein transmission and reception occur in substantially overlapping frequencies, wherein transmission occurs in a first period of time using a first number of bits per symbol and in a second substantially non-overlapping period of time using a second number of bits per symbol, and wherein reception occurs in the first and the second periods of time.

8. The method of claim 7, wherein the communication further occurs at a bit rate greater than 33.6 kbps.

9. The method of claim 8, wherein the communication further occurs at a bit rate greater than 56 kbps.

10. The method of claim 7, wherein the digital subscriber line communication additionally uses frequencies above 4 kHz.

11. The method of claim 7, wherein the digital subscriber line communication utilizes at least one modulation selected from the group consisting of: pulse amplitude modulation (PAM), discrete multi-tone (DMT) modulation, carrierless amplitude-phase (CAP) modulation, and quadrature amplitude modulation (QAM).

12. The method of claim 7, wherein the digital subscriber line communication additionally uses frequencies above 4 kHz.

* * * * *